UNITED STATES PATENT OFFICE.

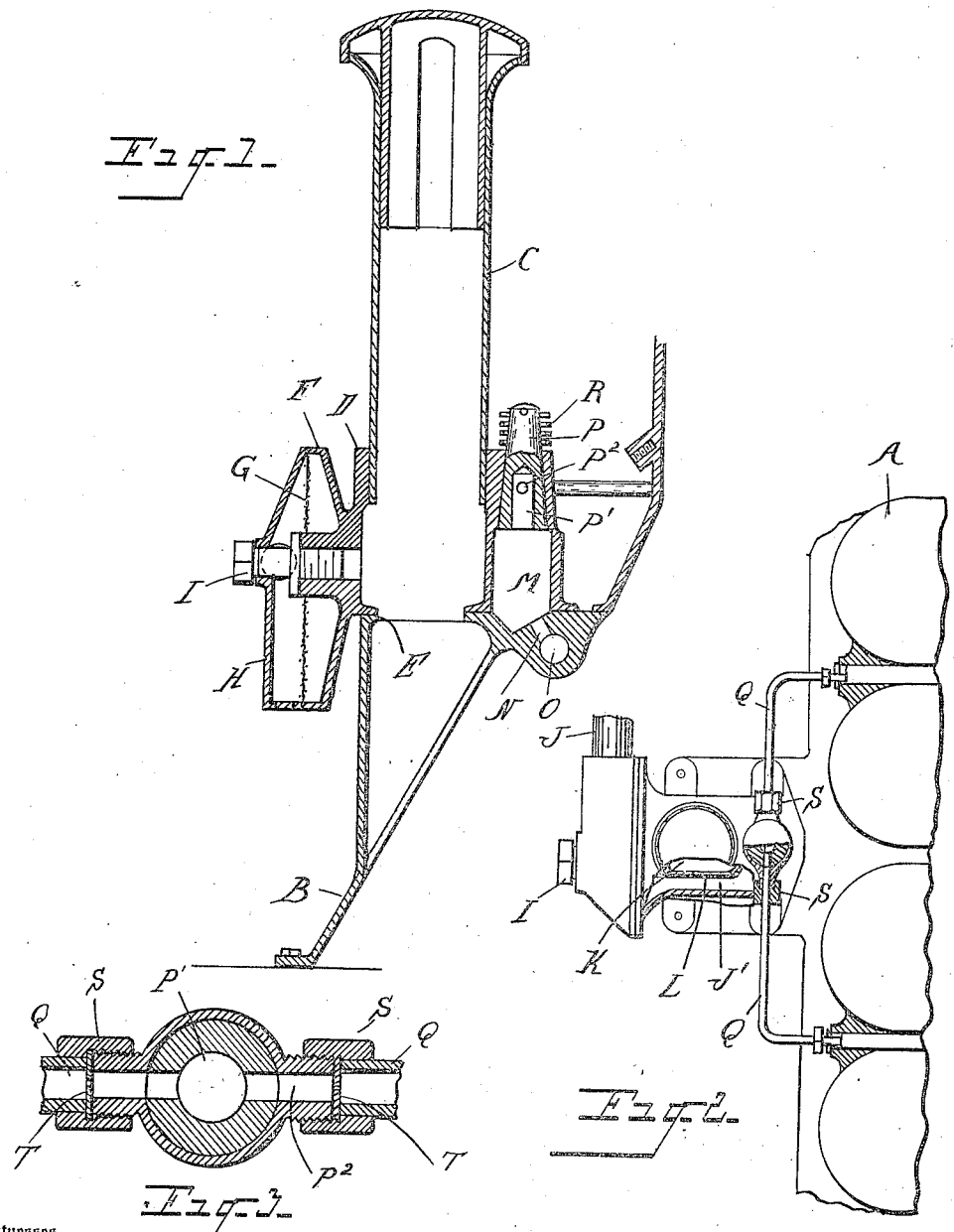

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

ENGINE-LUBRICATOR.

1,050,985.    Specification of Letters Patent.    Patented Jan. 21, 1913.

Application filed January 27, 1912.    Serial No. 673,837.

*To all whom it may concern:*

Be it known that I, EMIL A. NELSON, a citizen of the United States of America, residing at Detroit, in the county of Wayne and State of Michigan, have invented certain new and useful Improvements in Engine-Lubricators, of which the following is a specification, reference being had therein to the accompanying drawings.

The invention relates to engine lubricating devices and consists in the peculiar construction of parts and the combination and arrangement of the same with other accessories of the engine as hereinafter set forth.

In the drawings,—Figure 1 is a vertical section through a portion of the engine casing showing the lubricator attached thereto; Fig. 2 is a plan view partly in section; and Fig. 3 is a section through the plug.

A are engine cylinders, B is a common crank case therefor, and C is a conduit or stack for venting the crank case. This stack is secured to a member D which is bolted or otherwise secured to a bearing E on the crank case and which in addition to its function as a vent forms a portion of the lubricating system. In detail, the member D is provided on its outer end with an enlargement F in which a screen G is located. Beyond this screen is a dish-shaped cap member H which is secured by a bolt I and is connected to a conduit J through which the supply of lubricant is fed by any suitable pump or propelling device (not shown). On the inner side of the screen the chamber within the member F is connected by passages J′ surrounding the air vent passage K and separated therefrom by walls L. The passages J′ lead to a chamber M which at its bottom communicates with a port N with a longitudinally extending channel O in the crank case from which the lubricant is distributed to various bearings (not shown). Above the chamber M is a valve P controlling the discharge to a plurality of conduits Q leading to the several engine cylinders.

It is one of the objects of the invention to provide means of lubricating the pistons for the several engine cylinders by which the quantity of lubricant can be regulated and accurately proportioned to the several cylinders. This is accomplished by forming the valve P so that in every position of adjustment thereof the ports communicating with the several conduits Q will be equal or proportioned. As shown, the valve P is a hollow tapering plug with a central chamber P′ in open communication with the chamber M and oppositely extending ports P² which respectively register with the conduits Q. The upper end of the plug passes out from the member D and has sleeved thereon the spring R for yieldably holding the valve to its seat and may be rotatably adjusted by any suitable means (not shown). The conduits Q are connected with the valve casing by suitable coupling unions S which permit of attaching or detaching the member D.

With the construction as shown, the single member D forms the straining chamber for the lubricant, the valve case for the adjustment and distributing valve, and the support for the air vent or stack. It also forms the connection between the lubricant supply and the channel O in the crank case, the flow through the latter being unrestricted. In addition to the valve P, the flow of lubricant in the conduits Q is restricted by perforated diaphragms T, secured by the couplings S.

What I claim as my invention is:

1. The combination with an engine casing having a vent passage or stack, and a lubricant distributing channel in the wall thereof, of a member attached to said casing forming the connector for said stack and having a lubricant chamber therein communicating with said distributing channel.

2. The combination with an engine casing, of a member secured to said casing having a vent conduit or stack attached thereto and coupling the same to a vent opening in said case, said member being also provided with lubricant channels therein and having an enlargement containing a screen through which the lubricant is passed.

3. The combination with an engine casing, of a member attached thereto forming the base of a vent stack communicating with a vent aperture in said casing, said member also having lubricant passages formed therein around said air vent aperture, an enlargement at one end of said member, a screen in said enlargement through which the lubricant is passed, a valve controlled coupler at the opposite end of said member, and a plurality of conduits connected to said coupler having the flow of lubricant therethrough proportioned by said valve.

4. The combination with an engine casing, of a member D attached thereto having the enlargement E and the screen G therein, an air vent passage through said member, lubricant passages upon opposite sides of said air vent passage and communicating with said enlargement, a lubricant chamber at the opposite end of said member, and a valve controlling and restricting the flow of lubricant from said chamber to a plurality of conduits.

In testimony whereof I affix my signature in presence of two witnesses.

EMIL A. NELSON.

Witnesses:
 FRANK E. WATTS,
 GRANVILLE C. ALDRICH.

Copies of this patent may be obtained for five cents each, by addressing the "Commissioner of Patents, Washington, D. C."